R. Sanford.
Bee Hive.
Nº 97,124. Patented Nov. 23, 1869.
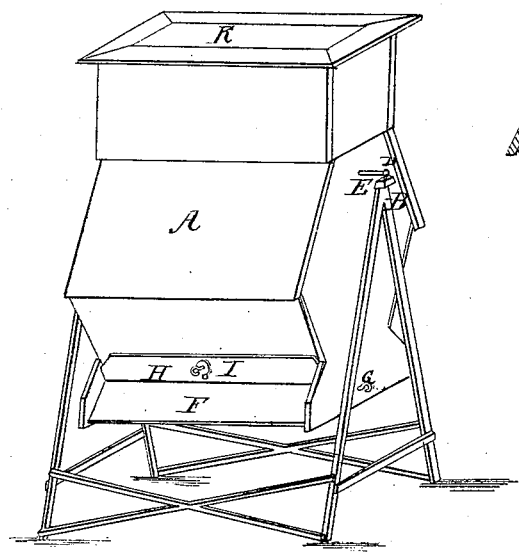
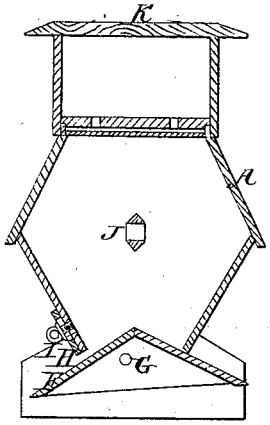
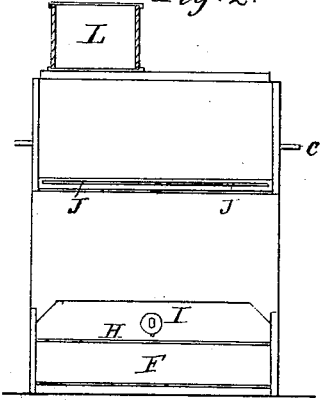
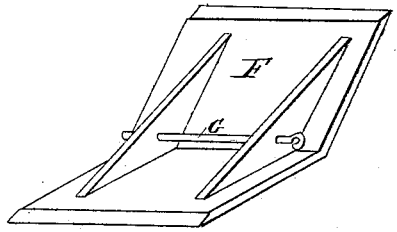
Witnesses:
L. C. Phillips
Nev Dine.
Inventor,
Riley Sanford
Per J. E. Rohie Atty

United States Patent Office.

RILEY SANFORD, OF MARION, NEW YORK.

Letters Patent No. 97,124, dated November 23, 1869.

IMPROVEMENT IN BEE-HIVES.

The Schedule referred to in these Letters Patent and making part of the same.

*To all whom it may concern:*

Be it known that I, RILEY SANFORD, of Marion, in the county of Wayne, and State of New York, have invented a new and useful Improvement in the Mode of Constructing Bee-Hives; and I do hereby declare that the following is a full and exact description thereof, reference being had to the accompanying drawings, making a part of this specification, in which—

Figure 1 is a perspective view of the hive in position.

Figure 2 represents the hive with the cover-box and side removed, showing one of the metallic honey-boxes and the transverse passage-way.

Figure 3 represents the vibratory double-inclined plane bottom detached.

Figure 4 is a vertical section.

Similar letters of reference indicate corresponding parts in each figure.

The nature of my invention consists in the construction of a bee-hive in the form of a hexagon, adapted to the natural shape of the honey-comb, and suspended by journals or trunnions attached near to the top and centre of the hive, which bear upon a frame provided with bearings projecting from the centre of cavities filled with a suitable fluid.

It also consists in a vibratory double-inclined plane bottom and a sliding valve, for the purpose of opening or closing either or both of the external passages for the bees. Also, in providing a transverse passage-way through the upper part of the hive, at right angles with the "bee-guides," whereby the bees may have convenient access to all parts of the hive during the winter.

I construct my bee-hive A in a hexagonal form, and suspend it on a frame, B, by means of journals or trunnions C, which bear in boxes D, projecting from the centre of cavities E, filled with water or other suitable fluid for preventing vermin from reaching the hive.

I make the bottom F a double-inclined plane, supported by a pin, G, upon which it may be vibrated back and forward, thereby opening or closing either side of the hive; the front opening or entrance H being graduated by a sliding valve, I, held in position by a set-screw, whereby, if found necessary, both openings may be closed by first moving the bottom back, which closes the one in the rear; the valve is then slid down, thereby closing the main entrance in front, or, if required, graduates it to any desired size.

By this arrangement, the refuse of the swarm is discharged through the openings, and the cleanliness of the hive secured.

For the purpose of adding to the convenience of the occupants of the hive during cold weather, I make a transverse passage-way, J, in the body of the hive, at right angles with the "bee-guides," which passes through each layer of the comb, whereby the bees may have free access during the winter to every part of the hive, thereby obviating their liability to starvation while there is still a supply of honey left.

The box K, which covers the top of the hive, encloses metallic honey-boxes L, with sliding glass ends, for the purpose of facilitating the operation of cleansing, and that they may be repeatedly used.

I am aware that in some respects my invention resembles others now in use, but the simplicity of the construction and effective results of my improvement have induced me to make this application. I therefore disclaim any interference with others, and confine myself only to the novel features of my invention.

Having thus described my invention,

What I claim, and desire to secure by Letters Patent, is—

The vibrating bottom F, transverse passage-way J, in combination with the form of the hive A, sliding valve I, insulated boxes D, frame B, and metallic box L, all being constructed as herein described and represented, for the purpose set forth.

RILEY SANFORD.

Witnesses:
A. B. NEWTON,
EMMONS MANLEY.